(12) United States Patent
Dhar et al.

(10) Patent No.: US 8,335,236 B2
(45) Date of Patent: Dec. 18, 2012

(54) FCOE ISOLATED PORT CHANNELS AND FCOE SESSION RESYNCHRONIZATION IN VPC/MCEC ENVIRONMENTS USING DCBXP

(75) Inventors: Sandeep Dhar, Karnataka (IN); Pradeep Kanyar, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 279 days.

(21) Appl. No.: 12/775,108

(22) Filed: May 6, 2010

(65) Prior Publication Data

US 2011/0274114 A1    Nov. 10, 2011

(51) Int. Cl.
*H04J 3/24* (2006.01)
(52) U.S. Cl. .................. 370/474; 370/401; 370/445
(58) Field of Classification Search .................. None
See application file for complete search history.

(56) References Cited

U.S. PATENT DOCUMENTS

| | | | |
|---|---|---|---|
| 7,406,038 B1* | 7/2008 | Oelke et al. | 370/225 |
| 8,014,395 B1* | 9/2011 | Aggarwal et al. | 370/392 |
| 8,108,454 B2* | 1/2012 | Snively et al. | 709/200 |

* cited by examiner

*Primary Examiner* — Hassan Phillips
*Assistant Examiner* — Mark A Mais
(74) *Attorney, Agent, or Firm* — Patterson & Sheridan, LLP (57) ABSTRACT

Methods and apparatus for automatically configuring an aggregated link between a device supporting Fiber Channel over Ethernet (FCoE) and two or more FCoE Forwarders (FCFs) configured as a virtual switch in an effort to isolate FCoE traffic from FCoE Initialization Protocol (FIP) traffic in the aggregated link without user intervention. The virtual switch may be configured using virtual PortChannel (vPC) or MultiChassis EtherChannel (MCEC) technology, for example. For some embodiments, following an exchange of Data Center Bridge Exchange (DCBX) Protocol packets identifying the aggregated link relationship to the device (e.g., a host or intermediate bridge), subchannels may be automatically created within the aggregated link and designated as carrying either FCoE or FIP traffic, thereby isolating the subchannels. In this manner, a user need not perform manual isolation of FCoE-carrying trunks in a data center environment.

18 Claims, 9 Drawing Sheets

FCOE ISOLATED PORT CHANNELS AND FCOE SESSION RESYNCHRONIZATION IN VPC/MCEC ENVIRONMENTS USING DCBXP

TECHNICAL FIELD

Embodiments of the present disclosure generally relate to network communications supporting Fibre Channel over Ethernet (FCoE) and, more particularly, to automatic isolation of Fibre Channel over Ethernet (FCoE) traffic by subchanneling the PortChannel members who support FCoE in virtual PortChannel (vPC) or MultiChassis EtherChannel (MCEC) environments.

BACKGROUND

Fibre Channel (FC) is a network technology primarily used for storage networking and running at gigabit speeds. FC is standardized in the T11 Technical Committee of the International Committee for Information Technology Standards (INCITS) and has become the standard connection type for storage area networks (SANs) in enterprise storage.

Fibre Channel over Ethernet (FCoE) is a mapping of FC frames natively over Ethernet, but is independent of the Ethernet forwarding scheme. This allows Fibre Channel to leverage 10 gigabit Ethernet networks while preserving the FC protocol, allowing a seamless integration with existing FC networks and management software. By preserving all FC constructs—maintaining the same latency, security, and traffic management attributes of FC while preserving investments in FC tools, training, and SANs, FCoE provides for I/O consolidation. FC is recognized as the dominant storage protocol in the data center, but the consolidation comes from using Ethernet to avoid creating another separate network.

The current proposal for FCoE, as defined by the INCITS T11 standards body, leverages a lossless Ethernet fabric, maintains the FC operational model and includes a newly approved frame format. Of note, FCoE is not tied to 10 gigabit Ethernet (10 GbE) and will be able to run over networks with varying interface speeds.

Modern data centers use both Ethernet for Transmission Control Protocol/Internet Protocol (TCP/IP) networks and FC for SANs, each dedicated to specific purposes. Ethernet networks are typically implemented when end-users need to transfer relatively small amounts of information over both local and global distances or in clustered, low-latency computer environments. SANs are generally utilized when access to block I/O for applications such as booting over SANs, mail servers, file servers, and large databases are required. Deploying SANs has a number of benefits including: (1) centralized management, security, and administration of the storage resources, (2) uniform delivery of storage services such as periodic backups, and (3) running efficient utilization levels of storage resources.

OVERVIEW

Embodiments of the present disclosure generally relate to automatically configuring an aggregated link between a device supporting Fibre Channel over Ethernet (FCoE) and two or more FCoE Forwarders (FCFs) configured as a virtual switch in an effort to isolate FCoE traffic from FCoE Initialization Protocol (FIP) traffic in the aggregated link without user intervention.

One embodiment of the present disclosure is a method. The method generally includes receiving, at a device supporting FCoE and connected with two or more FCFs configured as a virtual switch, control traffic with information about the virtual switch; automatically configuring an aggregated link between the device and the virtual switch based on the control traffic, the aggregated link comprising a first port of the device connected with a first one of the FCFs and a second port of the device connected with the first or a second one of the FCFs, by designating the first port for FCoE traffic and the second port for FCoE Initialization Protocol (FIP) traffic; and exchanging FIP and/or FCoE traffic using the automatically configured aggregated link.

Another embodiment of the present disclosure provides an apparatus for FCoE communication. The apparatus generally includes a first port for connecting with a first one of two or more FCFs configured as a virtual switch; a second port for connecting with the first or a second one of the FCFs; and logic configured to receive control traffic with information about the virtual switch, to automatically configure an aggregated link between the apparatus and the virtual switch based on the control traffic, wherein the aggregated link comprises the first and second ports, by designating the first port for FCoE traffic and the second port for FIP traffic, and to exchange FIP and/or FCoE traffic using the automatically configured aggregated link.

Yet another embodiment of the present disclosure provides an apparatus for FCoE communication. The apparatus generally includes means for connecting with a first one of two or more FCFs configured as a virtual switch; means for connecting with the first or a second one of the FCFs; means for receiving control traffic with information about the virtual switch; means for automatically configuring an aggregated link between the apparatus and the virtual switch based on the control traffic, the aggregated link comprising the means for connecting with the first one of the FCFs and the means for connecting with the first or the second FCFs, by designating the means for connecting with the first one of the FCFs for FCoE traffic and by designating the means for connecting with the first or the second one of the FCFs for FIP traffic; and means for exchanging FIP and/or FCoE traffic using the automatically configured aggregated link.

Yet another embodiment of the present disclosure provides a system. The system generally includes two or more FCFs configured as a virtual switch and an apparatus for FCoE communication connected with the FCFs. The apparatus typically includes a first port for connecting with a first one of the FCFs; a second port for connecting with the first or a second one of the FCFs; and logic configured to receive control traffic with information about the virtual switch, to automatically configure an aggregated link between the apparatus and the virtual switch based on the control traffic, wherein the aggregated link comprises the first and second ports, by designating the first port for FCoE traffic and the second port for FIP traffic, and to exchange FIP and/or FCoE traffic using the automatically configured aggregated link.

Yet another embodiment of the present disclosure is a method. The method generally includes resynchronizing two or more FCFs using Data Center Bridge Exchange (DCBX) Protocol packets, wherein the FCFs are configured as a virtual switch, and performing a FIP session handshake between the FCFs.

Yet another embodiment of the present disclosure provides an apparatus for FCoE communication. The apparatus generally includes a FCF capable of being configured as part of a virtual switch, which typically includes at least another FCF, and logic configured to resynchronize the FCFs of the virtual switch using DCBX Protocol packets and to perform a FIP session handshake between the FCFs of the virtual switch.

Yet another embodiment of the present disclosure provides an apparatus for FCoE communication. The apparatus generally includes a FCF capable of being configured as part of a virtual switch, which typically includes at least another FCF, means for resynchronizing the FCFs of the virtual switch using DCBX Protocol packets, and means for performing a FIP session handshake between the FCFs of the virtual switch.

Yet another embodiment of the present disclosure provides a system. The system generally includes a first apparatus having a first FCF, a second apparatus having a second FCF, wherein the FCFs are configured as a virtual switch, and logic configured to resynchronize the FCFs of the virtual switch using DCBX Protocol packets and to perform a FIP session handshake between the FCFs of the virtual switch.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Embodiments of the present disclosure provide methods and apparatus for automatically configuring an aggregated link between a device supporting Fibre Channel over Ethernet (FCoE) and two or more FCoE Forwarders (FCFs) configured as a virtual switch in an effort to isolate FCoE traffic from FCoE Initialization Protocol (FIP) traffic in the aggregated link without user intervention. The virtual switch may be configured using virtual PortChannel (vPC) or MultiChassis EtherChannel (MCEC) technology, for example. For some embodiments, following an exchange of Data Center Bridge Exchange (DCBX) Protocol packets identifying the aggregated link relationship to the device (e.g., a host or intermediate bridge), subchannels may be automatically created within the aggregated link and designated as carrying either FCoE or FIP traffic, thereby isolating the subchannels. In this manner, a user need not perform manual isolation of FCoE-carrying trunks in a data center environment, and thus, manual topology restrictions for FCoE traffic over vPC/MCEC and chances of misconfiguration may be eliminated.

An Example Data Center Network with a Virtual Switch

Figure 1:
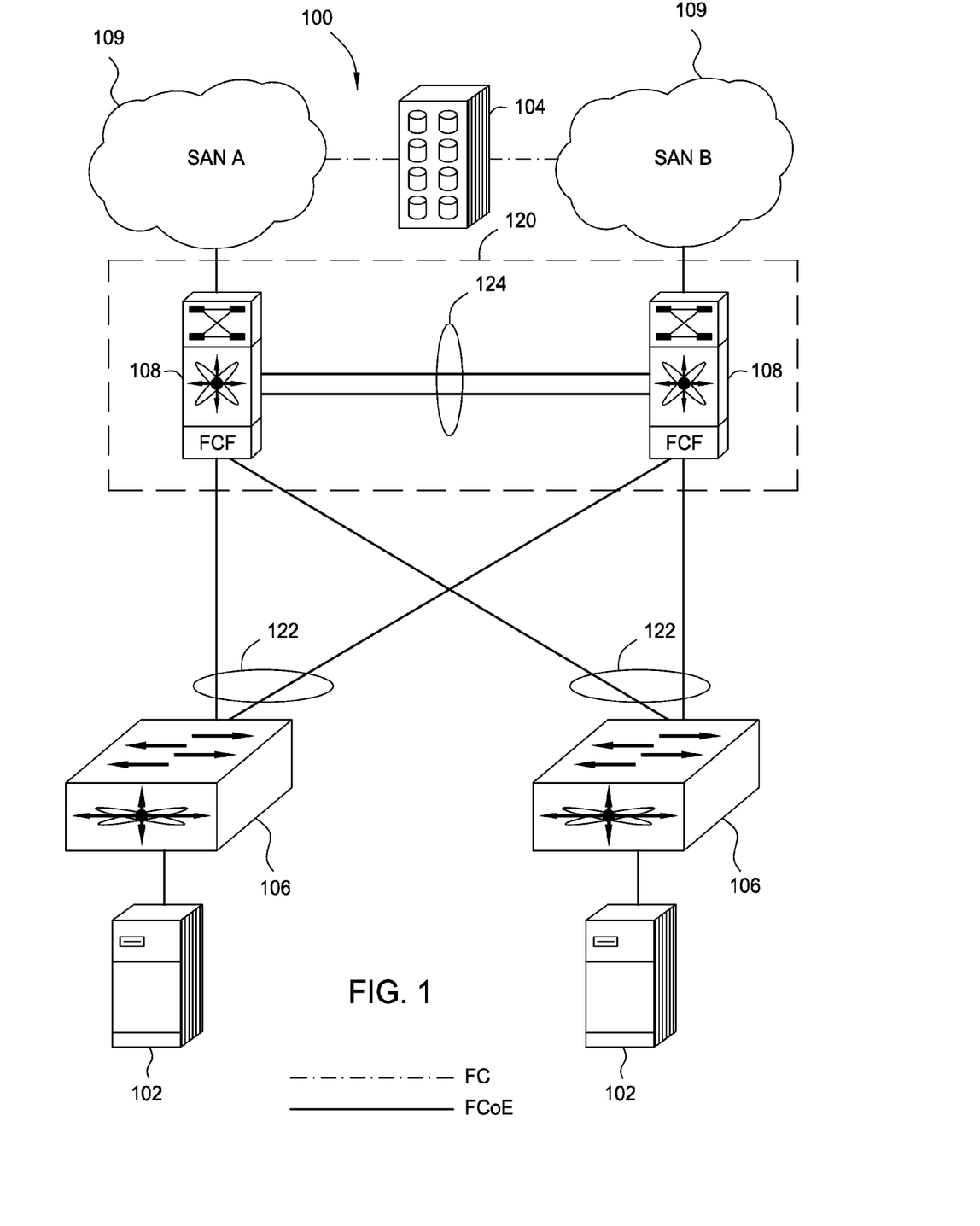
FIG. 1 illustrates an example data center network supporting Fibre Channel over Ethernet (FCoE) with two FCoE forwarders (FCFs) configured as a virtual switch, in accordance with an embodiment of the present disclosure.

FIG. 1 illustrates an example data center network 100 supporting FCoE with redundant connectivity, in accordance with an embodiment of the present disclosure. This infrastructure may be well-suited to storage communications, and therefore, may be implemented in a storage area network (SAN), for example. A fabric is similar in concept to a network segment in a local area network (LAN), and a typical FCoE SAN fabric may comprise a number of FCoE-enabled switches. These FCoE-enabled switches may be used to allow a host 102 to access a server 104, which may store a large amount of data in one or more various forms (e.g., one or more databases).

Hosts 102 may interface with the SANs via switches at the access layer. The two access layer switches may comprise intermediate bridges 106. For some embodiments, the access layer switches may comprise Nexus 5000 series switches supporting FIP snooping available from Cisco Systems, Inc.

In the data center network 100 of FIG. 1, a core layer is depicted above the access layer. The core layer in storage area networks is analogous to the distribution layer in Ethernet architectures. The core layer may comprise various FCoE core switches 108, each with an FCoE forwarder (FCF) for fabric login and address assignment as described in greater detail below. Devices may be logged into only one FCF per fabric. In the event of an FCF failure, all devices that were logged into that FCF may most likely need to re-login to the fabric through another FCF. For some embodiments, the core switches 108 may comprise Nexus 7000 series switches available from Cisco Systems, Inc.

The core switches 108 of a fabric may be linked to one or more switches at the edge layer of the data center network 100 via different SAN clouds 109 (e.g., SAN A and SAN B as illustrated). The edge layer switches (not shown) may reside within the SAN clouds 109 and may interface with the server 104 via native Fibre Channel (FC) as illustrated in FIG. 1. For some embodiments, the edge layer switches may comprise MDS 9000 series multilayer switches from Cisco Systems, Inc.

In native FC, access layer switches control the logins of locally attached devices. Initiators and targets login to the Domain and Name servers in FC networks to receive their Fibre Channel ID (FCID) in order to begin communicating on the fabric. The failure domain is only as large as the number of devices locally connected to that switch or director. This failure domain may be increased with the use of N Port Virtualization/N Port ID Virtualization (NPV/NPIV) enabled switches.

In an FCoE environment on the other hand, the fabric login process is typically controlled by the FCF. FIP handles the communication from ENodes (FC Nodes, such as a host or a server, with one or more lossless Ethernet media access control (MAC) addresses, each coupled with an FCoE controller) to FCFs for fabric login and address assignment. As the FCoE control protocol, FIP is responsible for establishing and maintaining Fibre Channel virtual links between pairs of FCoE devices (ENodes and FCFs). During the virtual link establishment phase, FIP may first discover FCoE Virtual Local Area Networks (VLANs) and remote virtual FC interfaces. Then, FIP may perform virtual link initialization functions (fabric login [FLOGI] and fabric discovery [FDISC], or exchange link parameters [ELP]) similar to their native FC equivalents. With FIP, an ENode, such as the host 102, may determine all the available FCFs and then select a particular FCF for the fabric login. After the ENode has discovered all FCFs and selected one for login, the last step may be to inform the selected FCF of the intention to create a virtual link with its VF_Port.

After the virtual link is established, FC payloads (encapsulated in FCoE frames) may be exchanged on the virtual link, and FIP may remain in the background to perform virtual link maintenance functions. For example, FIP may continuously verify reachability between the two virtual FC interfaces on the Ethernet network, and FIP may offer primitives to delete the virtual link in response to administrative actions to that effect.

Furthermore, FIP has been designed to enable network bridges to efficiently monitor FIP frames passing through them using a mechanism known as FIP snooping. By snooping on FIP packets during the discovery and login phases, intermediate bridges 106 can implement dynamic data integrity mechanisms using access control lists (ACLs) that permit valid FCoE traffic between the ENode and the FCF. Implementing such security mechanisms may ensure that only valid FCoE traffic is allowed. An intermediate bridge 106 implementing the above functionality may be referred to as an intermediate FIP snooping bridge.

FIP snooping may involve using Data Center Bridge Exchange (DCBX) Protocol to negotiate the FCoE parameters so that the FCoE cloud has end-to-end autoconfiguration for FCoE infrastructure and features. DCBX Protocol uses the standard Link Level Discovery Protocol (LLDP) IEEE standard 802.1ab-2005 to create a bidirectional negotiation path between peer nodes to push the FCoE configuration so that the FCoE cloud is consistent end-to-end.

To enjoy the benefits of IEEE 802.3ad PortChannel technology, as well as hardware redundancy in case of hardware failure, two or more FCFs of a data center network may be configured as a virtual switch 120, appearing as a single logical entity to attached devices. The FCFs composing the virtual switch 120 may be connected with a virtual switch link 124 for control plane communication between the FCFs. The virtual switch link 124 may be used to synchronize states between the FCFs and, for some embodiments, carry certain data traffic, as well as control traffic. Devices attached to the virtual switch 120, such as intermediate bridges 106, may be connected with the virtual switch using an aggregated link 122. Two separate aggregated links 122 are portrayed in FIG. 1. Also known as a trunk or a multilink trunk, an aggregated link 122, as used herein, generally refers to two or more links connecting one device with two or more different FCFs and grouped together to create one logic link, typically for providing fault-tolerance and higher speed links.

Figure 2A:
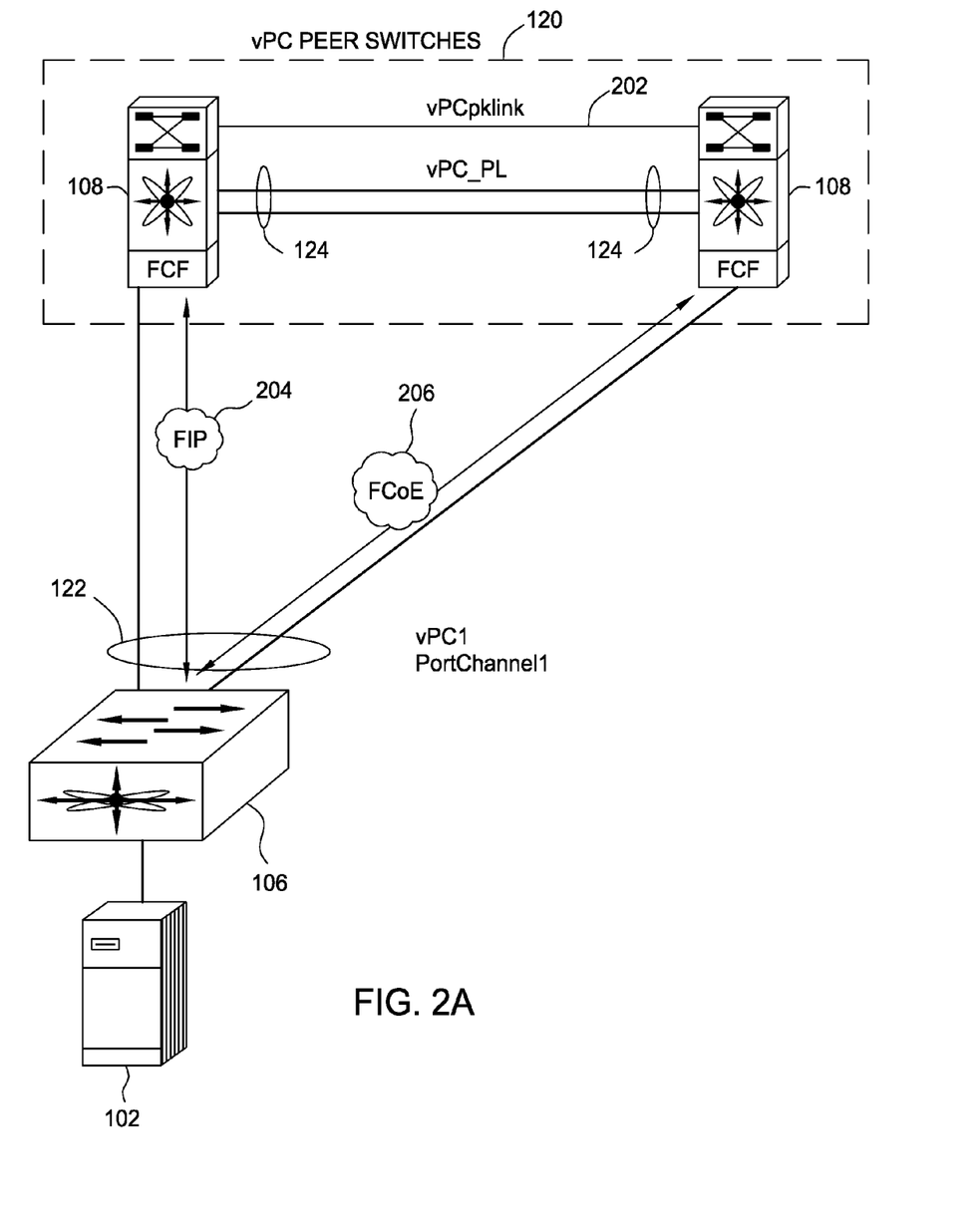
FIG. 2A illustrates a portion of the data center network of FIG. 1 where the two FCFs are configured as virtual PortChannel (vPC) peer switches, in accordance with an embodiment of the present disclosure.

Referring now to FIG. 2A, the virtual switch 120 may be configured using virtual PortChannel (vPC) technology for some embodiments, wherein the two FCFs shown are configured as two vPC peer switches and the aggregated link 122 comprises a vPC designated as vPC1 (or generically as PortChannel1). A vPC can provide Layer 2 multipathing, which provides for creating redundancy by increasing bandwidth, enabling multiple parallel paths between nodes, and load-balancing traffic where alternative paths exist. vPC refers to the combined PortChannel between the vPC peer switches and the downstream device (e.g., an intermediate bridge 106 or a host 102). The virtual switch link 124 between the two FCFs may comprise a vPC peer link (vPC_PL), typically communicating over at least two 10 Gigabit Ethernet (10 GbE) interfaces. A vPC peer keepalive link (vPCpklink) 202 may also connect the two FCFs, carrying periodic keepalive messages between the two FCFs to monitor their vitality. Typically, the only traffic on the vPCpklink 202 is a message indicating that the originating device is operating and running vPC.

Figure 2B:
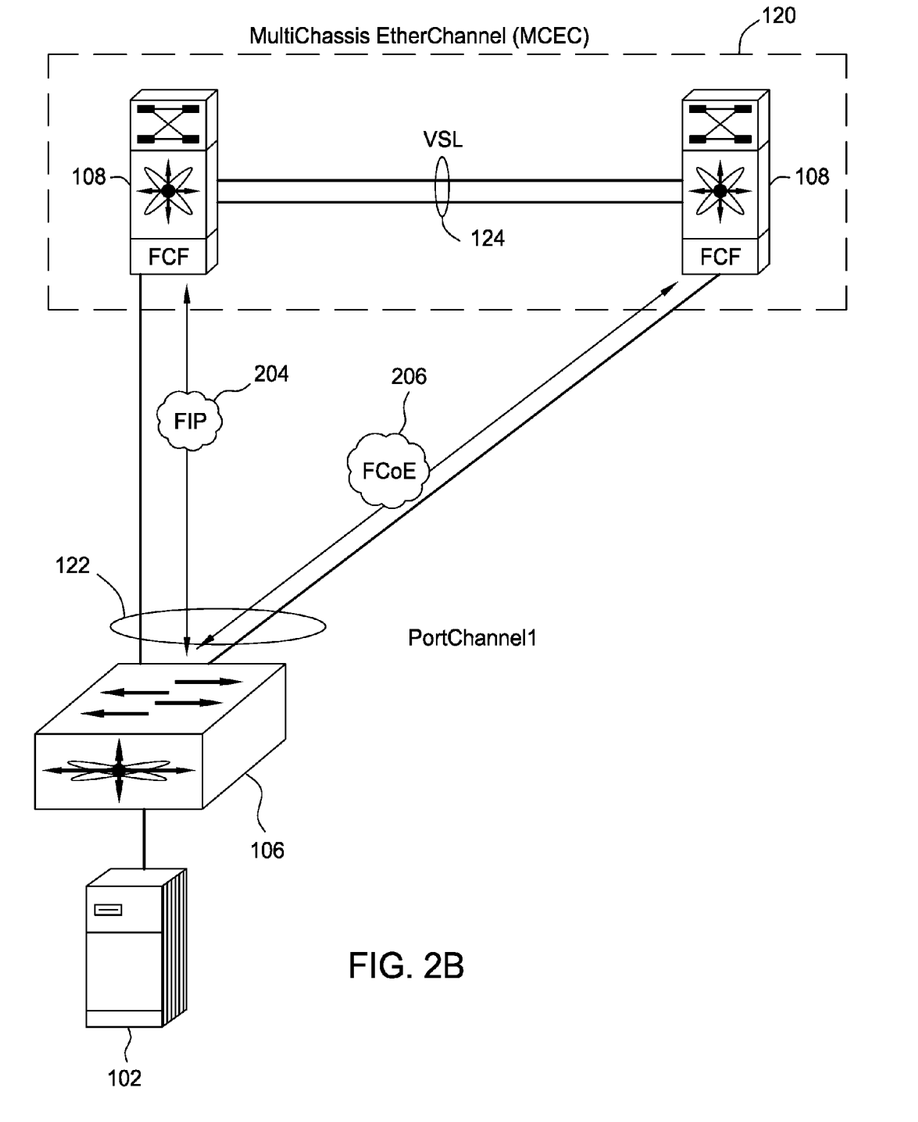
FIG. 2B illustrates the same portion of the data center network as FIG. 2A, but where the virtual switch is configured using MultiChassis Ether Channel (MCEC) technology, in accordance with an embodiment of the present disclosure.

For other embodiments, the virtual switch 120 may be configured using another Layer 2 multipathing technology known as MultiChassis Ether Channel (MCEC) to form a Virtual Switching System (VSS) as illustrated in FIG. 2B. In MCEC, a Virtual Switch Link (VSL) (also known as a multichannel trunk or MCT) may connect the virtual switch members (e.g., the FCFs). The VSL may comprise up to eight 10 GbE connections and may carry regular data traffic, in addition to the control plane communication between the FCFs.

In data center networks with a virtual switch 120 supporting FCoE, such as those shown in FIGS. 1, 2A, and 2B, an ENode (e.g., a host 102) or an intermediate bridge 106 may exchange FIP traffic 204 with one FCF of the virtual switch via one set of ports while exchanging FCoE traffic 206 with a different FCF of the virtual switch via a different set of ports. In other words, the aggregated link 122 is isolated such that FIP traffic 204 is exchanged with one FCF, while FCoE traffic 206 is exchanged with a different FCF. One method to achieve this isolation is to have the FCFs of the virtual switch 120 exchange the FCoE/FIP session information over the virtual switch link (e.g., the MCT). Another method involves manually isolating the FCoE-carrying links from the FIP-carrying links in the deployment, which may consume setup time and expenses.

Accordingly, what are needed are techniques and apparatus for automatically isolating the FCoE-carrying links from the FIP-carrying links in virtual switch environments.

An Example Automatic Isolation of an FCoE Aggregated Link

Figure 3:
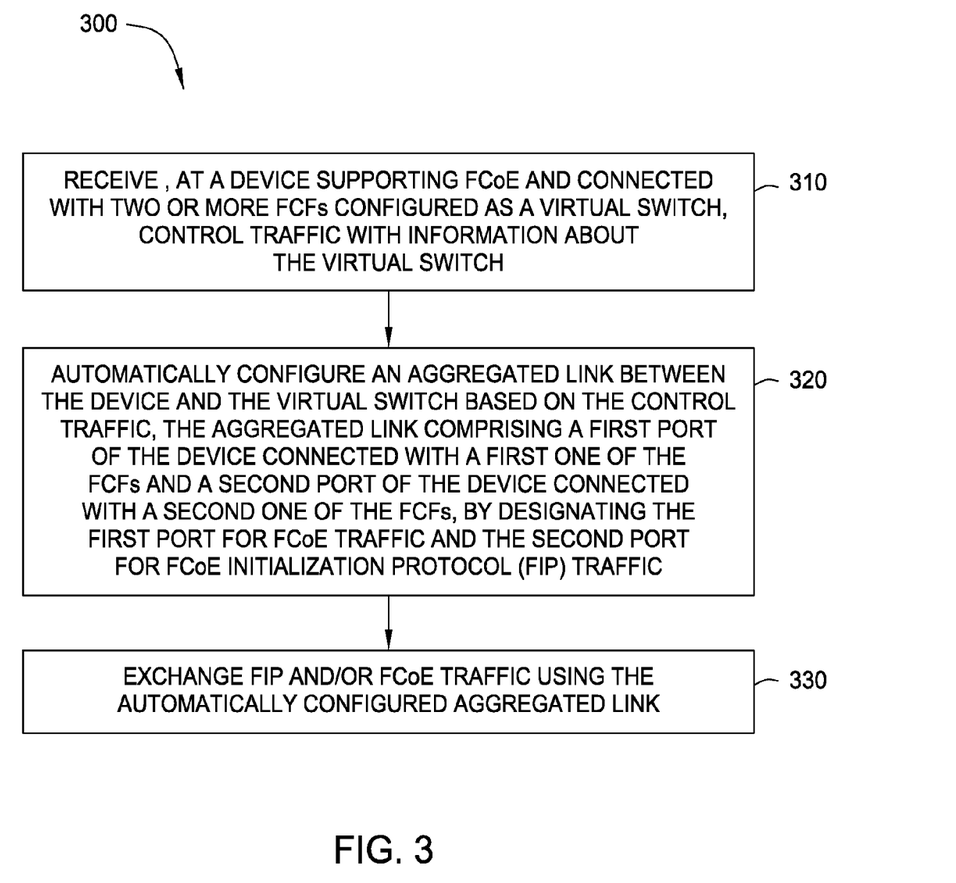
FIG. 3 illustrates example operations for automatically configuring and using an aggregated link between a device supporting FCoE and two or more FCFs to isolate FCoE traffic from FIP traffic, in accordance with an embodiment of the present disclosure.

FIG. 3 illustrates example operations 300 for automatically configuring and using an aggregated link 122 between a device supporting FCoE (e.g., a host 102 or an intermediate bridge 106) and two or more FCFs configured as a virtual switch 120 in an effort to isolate FCoE traffic 206 from FIP traffic 204.

Figure 4:
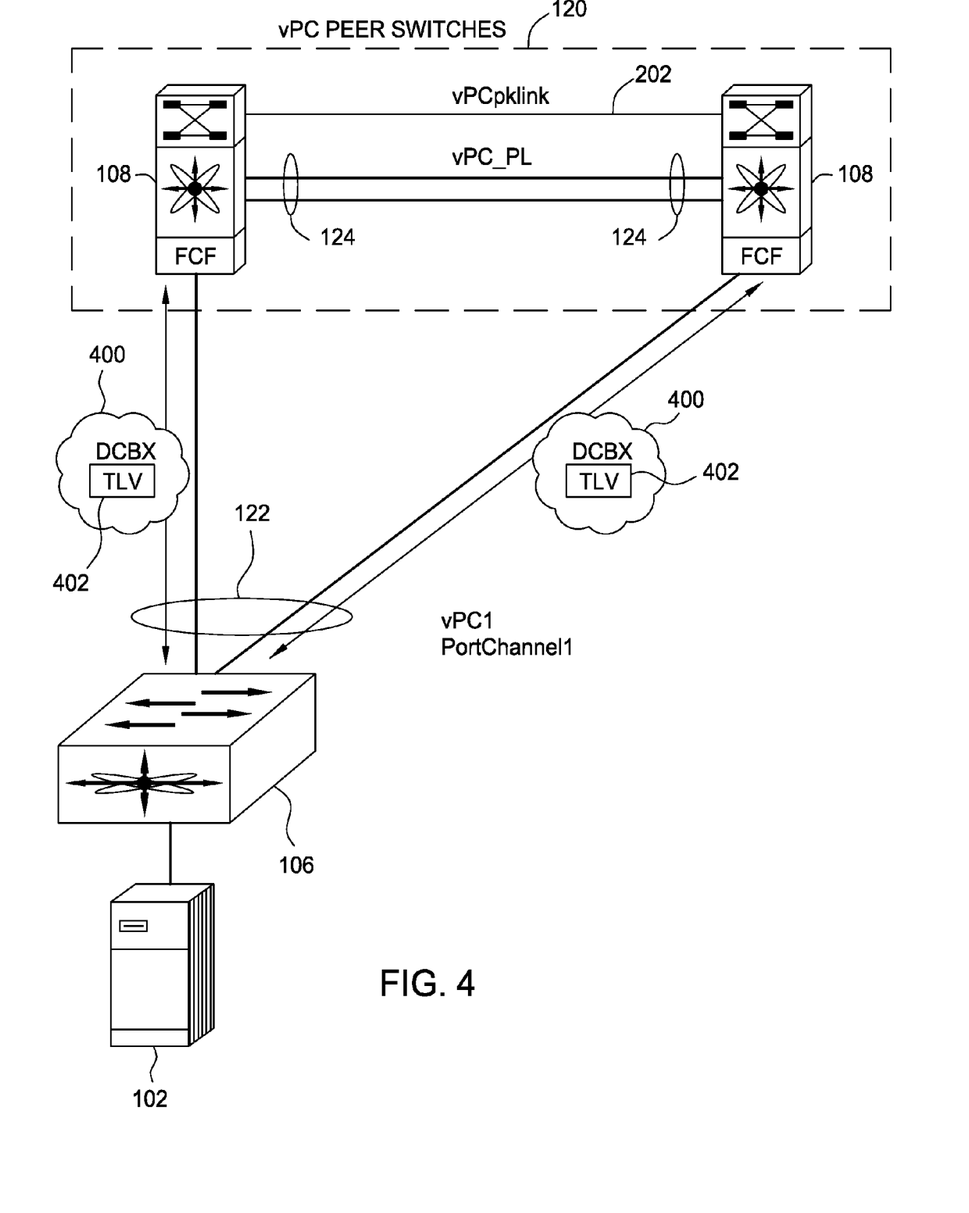
FIG. 4 illustrates exchanging Data Center Bridge Exchange (DCBX) Protocol packets with information about the virtual switch relationship and the aggregated link in the data center network of FIG. 2A, in accordance with an embodiment of the present disclosure.

The operations 300 may begin, at 310, by receiving control traffic with information about the virtual switch 120 and the aggregated link 122. For some embodiments, this control traffic may comprise Data Center Bridge Exchange (DCBX) Protocol packets, which may contain type-length-value (TLV) elements with the fabric and node information. For example, FIG. 4 illustrates exchanging DCBX Protocol packets 400 in the data center network of FIG. 2A with information about the virtual switch relationship and the aggregated link expressed in one or more TLV elements 402. The DCBX Protocol exchange of the TLV elements may identify the vPC relationship to the intermediate bridge 106 or the host 102. Such an exchange may occur when an intermediate bridge 106 or an ENode (e.g., a host 102) is first connected with a FCF during deployment.

At 320 in FIG. 3, the device supporting FCoE may automatically configure an aggregated link 122 between the device and the virtual switch 120 based on the received control traffic by designating a first set of one or more ports on the device for FCoE traffic 206 and by designating a second set of one or more ports on the device for FIP traffic 204. For some embodiments, the first set of device ports may be connected with one of the FCFs in the virtual switch 120, while the second set of device ports may be connected with a different FCF in the virtual switch 120. For other embodiments, the first and second sets of device ports may be connected with the same FCF in the virtual switch 120. The first and second sets of device ports may most likely be mutually exclusive. Unlike manually configuring the aggregated link 122 to isolate FIP traffic 204 from FCoE traffic, the automatic configuration of the aggregated link may occur without any user intervention or configuration.

Figure 5:
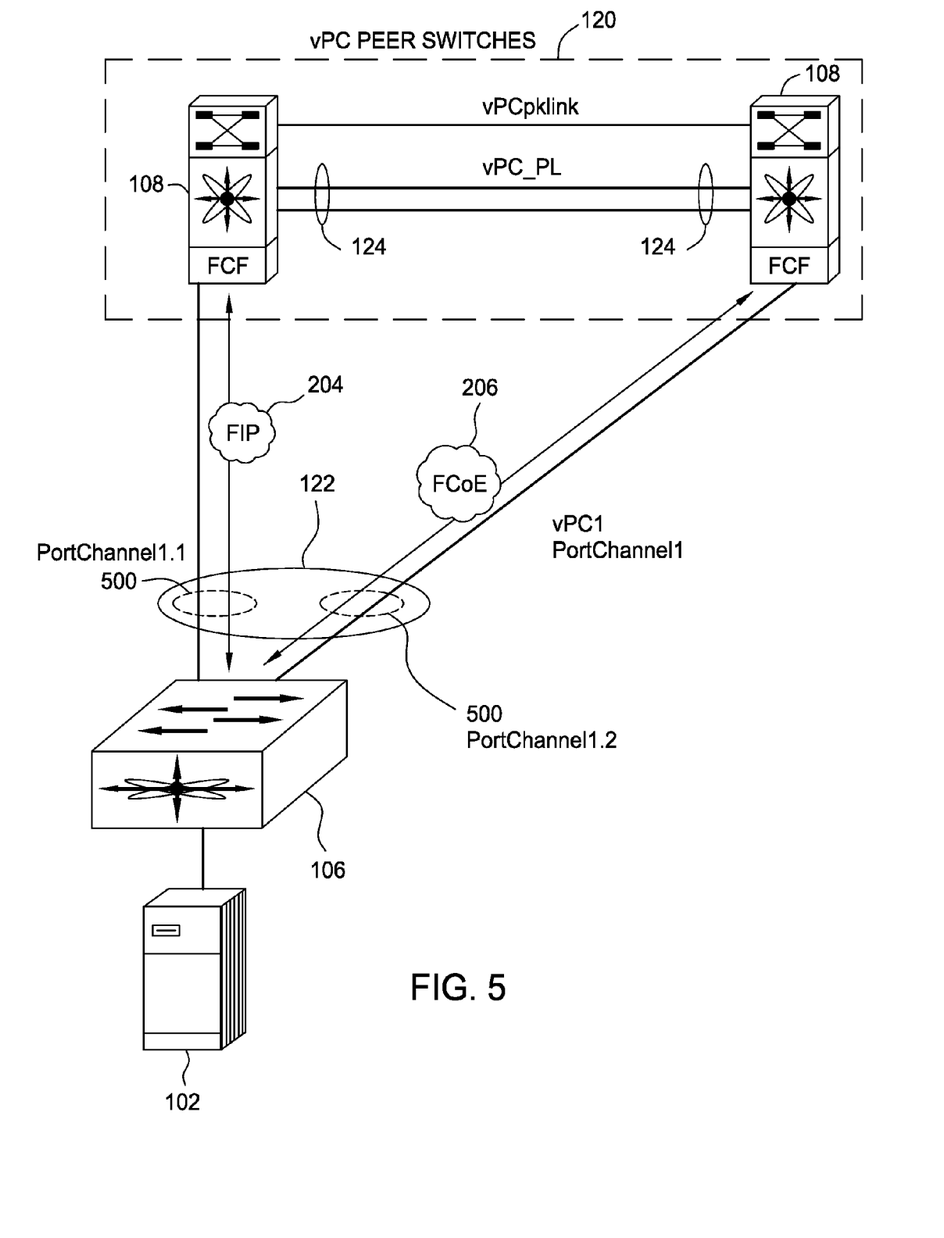
FIG. 5 illustrates isolated subchannels in the vPC of FIG. 2A, in accordance with an embodiment of the present disclosure.

For some embodiments, depending on whether the Link Aggregation Control Protocol (LACP) running on the device supporting FCoE is in ON mode or active mode, the LACP software may automatically create subchannels for the aggregated link 122. For example, FIG. 5 illustrates isolated subchannels 500 in the aggregated link 122 of FIG. 2A. If the aggregated link 122 is designated as PortChannel1, two subchannels designated as PortChannel1.1 and PortChannel1.2 may be automatically created, dividing the ports that carry FCoE traffic 206 from the ports that carry FIP traffic 204. For some embodiments, Port Aggregation Protocol (PAgP) from Cisco Systems, Inc. may be used as a proprietary type of LACP to configure the aggregated link 122.

At 330 in FIG. 3, the device supporting FCoE may exchange the FIP traffic 204 and/or the FCoE traffic 206 using the automatically configured aggregated link 122. In FIG. 5, for example, the intermediate bridge 106 exchanges FIP traffic 204 with one FCF of the virtual switch, but exchanges FCoE traffic 206 with a different FCF of the virtual switch using the subchannel designated as PortChannel1.2.

Figure 6:
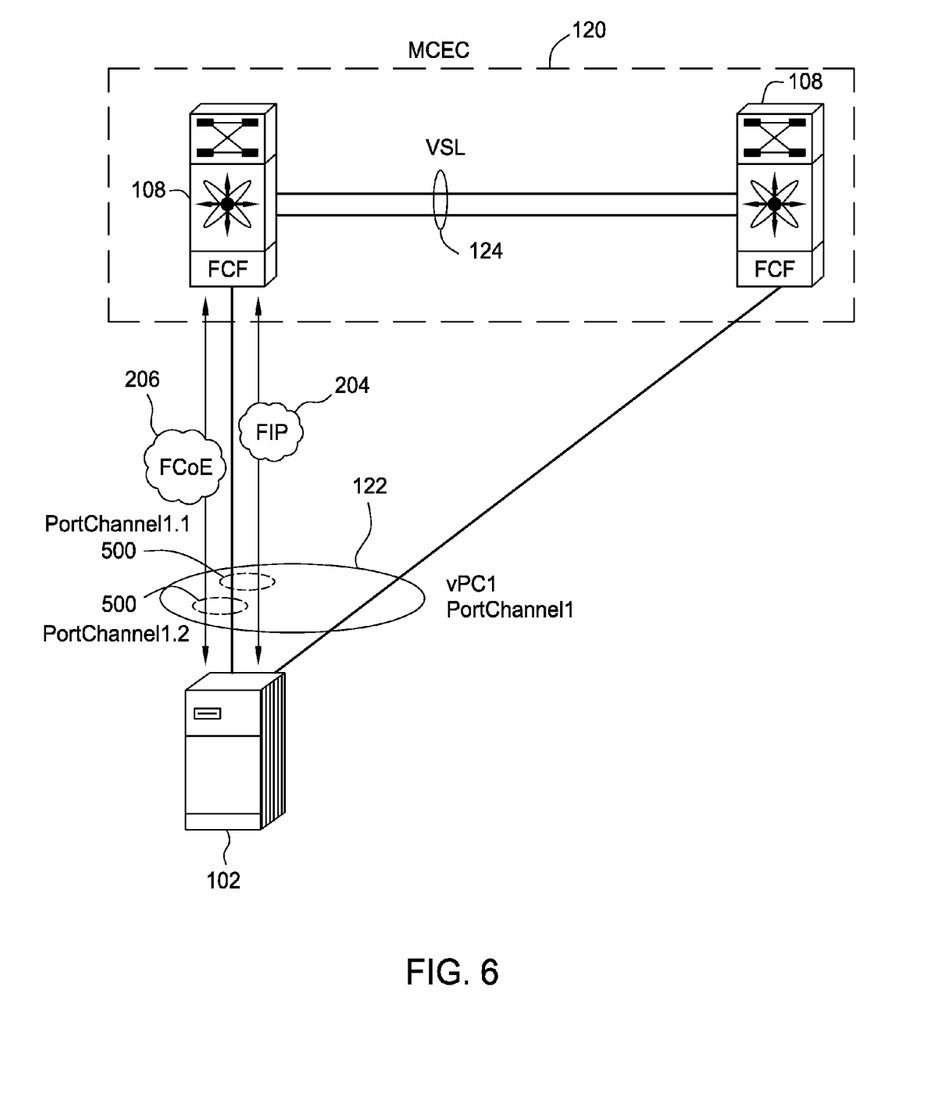
FIG. 6 illustrates isolated subchannels in an aggregated link between a host and two FCFs without intermediate bridges, in accordance with an embodiment of the present disclosure.

For some embodiments, an ENode (e.g., a host 102 or a server) may be connected with the FCFs of a virtual switch 120 without an intermediate bridge 106 in a data center network. For example, FIG. 6 illustrates isolated subchannels 500 in an automatically configured aggregated link 122 designated as PortChannel1 between a host 102 and two FCFs configured as a VSS using MCEC technology. Here, a first set of one or more ports on the host 102 may be automatically designated for FIP traffic 204 within a subchannel 500 dubbed PortChannel1.1, while a second set of one or more ports on the host 102 may be automatically designated for FCoE traffic 206 within another subchannel 500 dubbed PortChannel1.2. For some embodiments, the first and second sets of host ports associated with both subchannels 500 (PortChannel1.1 and PortChannel1.2) may be connected with the same FCF as shown in FIG. 6.

By automatically configuring the aggregated link in the manner described above, a user need not perform manual isolation of FCoE-carrying trunks in a data center environment. Furthermore, manual topology restrictions for FCoE traffic over vPC/MCEC may be eliminated, and chances of misconfiguring a data center network may be significantly reduced.

An Example FCoE Session Resynchronization

For a virtual switch 120 configured as a vPC/MCEC cluster as described above, other serious issues or problems may arise for FCoE traffic. For example, FIP session initiation may occur on one virtual switch member node, while traffic occurs on another. Furthermore, mixing and leakage across different (v)SAN fabrics may transpire if virtual switch member nodes support FCFs in different (v)SANs. Automatic detection and repairing of this leakage may be problematic without any deployment restrictions or user intervention. Certain error conditions occurring on a virtual switch member node may also cause problems for FCoE traffic. As another example, there may be database synchronization issues from performing an In-Service Software Upgrade (ISSU) or a supervisor or linecard switchover on virtual switch member nodes. Accordingly, what is needed are techniques and apparatus for resynchronizing virtual switch member nodes for a more robust and reliable FCoE deployment over vPC/MCEC.

Figure 7:
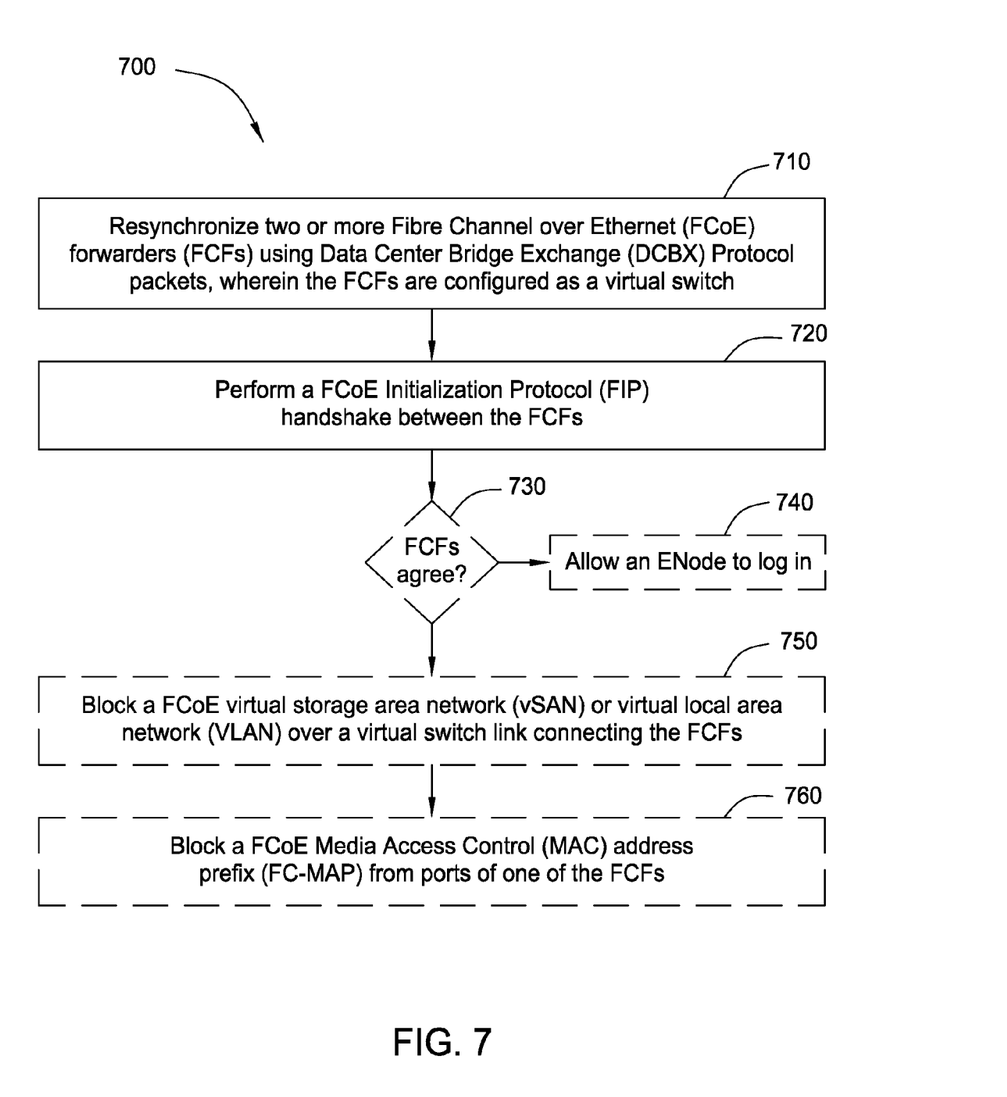
FIG. 7 illustrates example operations for FCoE session resynchronization between FCFs configured as a virtual switch, in accordance with an embodiment of the present disclosure.
Figure 8:
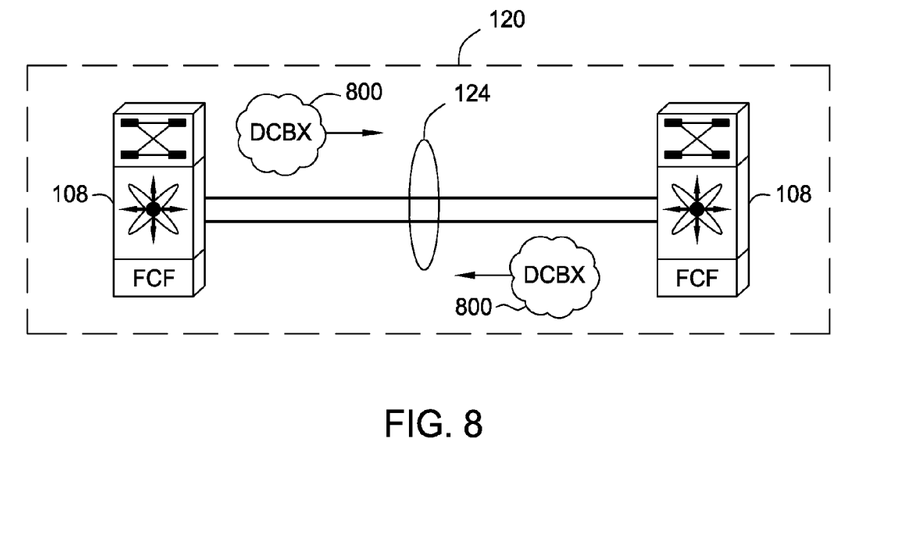
FIG. 8 illustrates resynchronizing two FCFs of the virtual switch in FIG. 1 using DCBX Protocol packets transmitted across the virtual switch link, in accordance with an embodiment of the present disclosure.

FIG. 7 illustrates example operations 700 for FCoE session resynchronization between FCFs configured as a virtual switch 120. The operations 700 may begin, at 710, by resynchronizing two or more FCFs of the virtual switch 120 using DCBX Protocol packets. As illustrated in FIG. 8, these DCBX Protocol packets 800 may be transmitted between the virtual switch member FCFs across the virtual switch link 124, such as a vPC_PL or a MCT. The resynchronization mechanism may occur in at least two different ways. For some embodiments, at the link bring-up time, a sequence or checksum number may be exchanged along with a list of SANs supported by each virtual switch member FCF, the VLAN and FC_MAP information, and optionally all the FC_IDs and ENode MAC addresses registered with the virtual switch member FCF for each LAN/SAN segment in TLV format. For other embodiments, either virtual switch member FCF may query the other member FCF to send a list of SANs, VLAN-SAN-FC_MAP mapping, and FC_IDs and ENode MAC addresses logged into each LAN/SAN. The other member FCF may respond with this information in TLV format in response to the query. Based on the above mechanisms, each virtual switch member FCF may know the other member FCF's complete database and may make an appropriate decision according to this database.

This resynchronization for FCoE sessions at 710 may be triggered by a certain event and thus may occur automatically. For example, resynchronization may occur during or after startup of a virtual switch member node (e.g., a core switch 108 having an FCF), formation of the virtual switch 120, an ISSU or a supervisor or linecard switchover.

Figure 9:
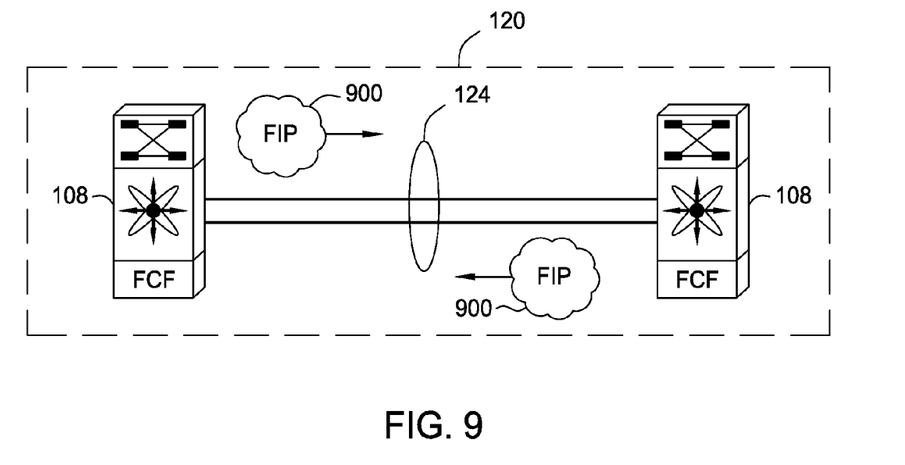
FIG. 9 illustrates performing a FIP session handshake between the two FCFs of the virtual switch in FIG. 1 across the virtual switch link, in accordance with an embodiment of the present disclosure.

At 720 in FIG. 7, the virtual switch member nodes may perform a FIP session handshake. As an example, FIG. 9 illustrates sending FIP traffic 900 for the FIP session handshake across the virtual switch link 124. During the FIP session handshake at 720 for an FIP session add, as an example, one of the virtual switch member nodes (Node 1) may transmit a FIP message to another virtual switch member node (Node 2), in an effort to determine if the latter node (Node 2) also agrees to allow an ENode (e.g., a host 102) to log into the fabric. Node 2 may respond with a FIP message transmitted to Node 1 across the virtual switch link 124.

If the virtual switch member nodes (or, more particularly, the FCFs) agree at 730, then Node 1 may allow the ENode to login at 740. However, if the virtual switch member nodes disagree (i.e., Node 2 does not agree to allow the ENode to login), the FCoE vSAN or VLAN may be blocked over the virtual switch link connecting the two virtual switch member nodes at 750. At 760, Node 2 may block the FCoE Media Access Control (MAC) address prefix (FC-MAP) of this vSAN or VLAN from Node 2's ports. In this manner, mixing and leakage across fabrics may be prevented within the virtual switch 120.

Embodiments of the present disclosure may provide for automatic and robust FCoE deployment when FCFs are configured as virtual switches using, for example, vPC or MCEC. By resynchronizing virtual switch member nodes in the manner described above, two SANs may be configured over members of the same virtual switch without leakage across fabrics and without any deployment restrictions or user intervention. Furthermore, any level of redundancy may be configured using the techniques described above. All these advantages lead to a robust, reliable and automatically configured data center network supporting FCoE and FCFs configured as virtual switches.

While the foregoing is directed to embodiments of the present disclosure, other and further embodiments of the disclosure may be devised without departing from the basic scope thereof, and the scope thereof is determined by the claims that follow.

The invention claimed is:

1. A method to isolate Fibre Channel over Ethernet (FCoE) traffic from FCoE Initialization Protocol (FIP) traffic, comprising:
   receiving, at a device supporting FCoE and connected with two or more FCoE Forwarders (FCFs) configured as a virtual switch, control traffic comprising a Data Center Bridge Exchange (DCBX) Protocol packet, wherein the control traffic provides information about the virtual switch;
   automatically configuring an aggregated link between the device and the virtual switch based on the control traffic, the aggregated link comprising a first port of the device connected with a first one of the FCFs and a second port of the device connected with one of the first one and a second one of the FCFs, by designating the first port for FCoE traffic and the second port for FIP traffic; and
   exchanging FIP and FCoE traffic using the automatically configured aggregated link, wherein FCoE traffic and not FIP traffic is exchanged through the first port, and FIP traffic and not FCOE traffic is exchanged through the second port.

2. The method of claim 1, wherein the DCBX Protocol packet comprises a type-length-value (TLV) element with the information about the virtual switch.

3. The method of claim 1, wherein the aggregated link comprises a virtual PortChannel (vPC).

4. The method of claim 3, wherein the FCFs are configured as vPC peer switches.

5. The method of claim 1, wherein the virtual switch is configured using Multi-Chassis EtherChannel (MCEC) technology.

6. The method of claim 1, wherein automatically configuring the aggregated link comprises creating a first subchannel associated with the first port and a second subchannel associated with the second port within the aggregated link.

7. The method of claim 1, wherein the device supporting FCoE comprises a network bridge or a host.

8. An apparatus to isolate Fibre Channel over Ethernet (FCoE) traffic from FCoE Initialization Protocol (FIP) traffic communication, comprising:
   a first port for connecting with a first one of two or more FCoE Forwarders (FCFs) configured as a virtual switch;
   a second port for connecting with one of the first one and a second one of the FCFs; and
   logic configured to receive control traffic comprising a Data Center Bridge Exchange (DCBX) Protocol packet, wherein the control traffic provides information about the virtual switch, to automatically configure an aggregated link between the apparatus and the virtual switch based on the control traffic, wherein the aggregated link comprises the first and second ports, by designating the first port for FCoE traffic and the second port for FIP traffic, and to exchange FIP and FCoE traffic using the automatically configured aggregated link, wherein FCoE traffic, and not FIP traffic is exchanged through the first port and FIP traffic and not FCoE traffic is exchanged through the second port.

9. The apparatus of claim 8, wherein the DCBX Protocol packet comprises a type-length-value (TLV) element with the information about the virtual switch.

10. The apparatus of claim 8, wherein the aggregated link comprises a virtual PortChannel (vPC).

11. The apparatus of claim 10, wherein the FCFs are configured as vPC peer switches.

12. The apparatus of claim 8, wherein the virtual switch is configured using Multi-Chassis EtherChannel (MCEC) technology.

13. The apparatus of claim 8, wherein the logic is configured to automatically configure the aggregated link by creating a first subchannel associated with the first port and a second subchannel associated with the second port within the aggregated link.

14. An apparatus to isolate Fibre Channel over Ethernet (FCoE) traffic from FCoE Initialization Protocol (FIP) traffic communication, comprising:
   means for connecting with a first one of two or more FCoE Forwarders (FCFs) configured as a virtual switch;
   means for connecting with one of the first one and a second one of the FCFs;
   means for receiving control traffic comprising a Data Center Bridge Exchange (DCBX) Protocol packet, wherein the control traffic provides information about the virtual switch;
   means for automatically configuring an aggregated link between the apparatus and the virtual switch based on the control traffic, the aggregated link comprising the means for connecting with the first one of the FCFs and the means for connecting with the first or the second one of the FCFs, by designating the means for connecting with the first one of the FCFs for FCoE traffic and by designating the means for connecting with the first or the second one of the FCFs for FIP traffic; and
   means for exchanging FIP and FCoE traffic using the automatically configured aggregated link, wherein FCoE traffic and not FIP traffic, is exchanged through the first port and FIP traffic and not FCoE traffic, is exchanged through the second port.

15. The apparatus of claim 14, wherein DCBX Protocol packet comprises a type-length-value (TLV) element with the information about the virtual switch.

16. The apparatus of claim 14, wherein the aggregated link comprises a virtual PortChannel (vPC) and the FCFs are configured as vPC peer switches.

17. The apparatus of claim 14, wherein the virtual switch is configured using Multi-Chassis EtherChannel (MCEC) technology.

18. The apparatus of claim 14, wherein the means for automatically configuring the aggregated link creates a first subchannel and a second subchannel within the aggregated link, the first subchannel associated with the means for connecting with the first one of the FCFs and the second subchannel associated with the means for connecting with the first or the second one of the FCFs.

* * * * *

UNITED STATES PATENT AND TRADEMARK OFFICE
CERTIFICATE OF CORRECTION

PATENT NO. : 8,335,236 B2
APPLICATION NO. : 12/775108
DATED : December 18, 2012
INVENTOR(S) : Dhar et al.

It is certified that error appears in the above-identified patent and that said Letters Patent is hereby corrected as shown below:

Title Page, Title (54) and Col. 1, lines 1-3:

Please delete "FCOE ISOLATED PORT CHANNELS AND FCOE SESSION RESYNCHRONIZATION IN VPC/MCEC ENVIRONMENTS USING DCBXP" and insert -- FCoE ISOLATED PORT CHANNELS AND FCoE SESSION RESYNCHRONIZATION IN vPC/MCEC ENVIRONMENTS USING DCBXP -- therefor;

Title Page, Abstract (57):

Line 2, please delete "Fiber" and insert -- Fibre -- therefor;

Claims:

Column 10, Claim 8, Line 7, please delete "communication";

Column 10, Claim 14, Line 42, please delete "communication".

Signed and Sealed this
Seventh Day of May, 2013

Teresa Stanek Rea
*Acting Director of the United States Patent and Trademark Office*